United States Patent Office 3,483,137
Patented Dec. 9, 1969

3,483,137
METHOD OF TREATING A SELECTIVE ADSORBENT
Eugene Edward Sensel, Beacon, N.Y., assignor to Texaco Inc., New York, N.Y., a corporation of Delaware
No Drawing. Filed Dec. 15, 1967, Ser. No. 690,757
Int. Cl. B01j 11/40, 11/66
U.S. Cl. 252—455     5 Claims

ABSTRACT OF THE DISCLOSURE

Method of treating a regenerated selective adsorbent by successive contacting with aqueous solutions of an alkali metal salt, sodium hydroxide and a salt having the same cation as said selective adsorbent.

---

This invention relates to a method for the treatment of molecular sieve selective adsorbents employed in separating organic mixtures based on differences in the molecular dimensions of the components of the mixture. More particularly the invention is directed to the reactivation or the restoration of activity of molecular sieve selective adsorbents used in separation process which have their selectivity decreased in use.

It is known in the art, for example, from Carter et al. U.S. 2,908,639 that molecular sieve selective adsorbents of type 5 A. structure used in separating straight chain hydrocarbons from hydrocarbon mixtures gradually build up deposits of tarry and/or carbonaceous deposits thereon which require frequent treatment (or regeneration) to remove these deposits and to restore the sorptive capacity of the selective adsorbent to or near its original selective capacity. Such methods may include treatment of the spent selective adsorbent with an appropriate solvent to remove any soluble adhering deposits therefrom, if present, followed by removing the remaining deposits, e.g., carbon or carbonaceous deposits by controlled burning in the presence of an oxygen containing gas or air to oxidize these deposits. Suitable burning temperatures are in the range of about 600–1000° F. while avoiding excessive burning temperatures that will destroy or damage the crystalline structure of the adsorbent being treated. However, local hot spots can and frequently do occur in such known regeneration methods with the result that a part of the zeolitic phase or phases of the selective adsorbent is changed to a non-zeolitic phase or phases that impair the sorptive capacity of the zeolite when used as a selective adsorbent.

It has now been found that after subjecting a molecular sieve selective adsorbent to a number of such oxidative regenerations, the sorptive capacity of the adsorbent for the preferentially adsorbable component of the hydrocarbon mixture being treated in the separation process is materially decreased, i.e. in the order of 5 to 30% of its original capacity, and that this loss in activity cannot be readily regained by present known regeneration techniques.

In accordance with the present invention the decline or decrease in adsorptive capacity of a molecular sieve selective adsorbent employed in a hydrocarbon separation process and which has been periodically regenerated by controlled burning in the presence of an oxygen containing gas can be restored or materially improved by the method of the present invention which comprises in a first treating step contacting said regenerated selective adsorbent with an aqueous solutiton of a water soluble salt of an alkali metal in an amount sufficient to convert the exchangeable cation content of said zeolite to the cation of said alkali metal, in a second step treating the formed alkali metal zeolite with an aqueous solution of sodium hydroxide to convert any non-zeolitic phases formed during the various oxidative regenerations to sodium zeolite and in a final step contacting the resulting treated zeolite with an aqueous solution of a water soluble salt having the same cation that was removed from said zeolite in the first treating step to reconvert said exchanged alkali metal portion of said zeolite to said cation of said water soluble salt.

The method of the present invention is applicable to the restoration of the capacity of any periodically regenerated zeolite which has its sorptive capacity reduced in use. Included in the scope of the invention are natural and/or synthetic crystalline zeolites such as chabazite, analcite, phacolite, gmelinite, harmotome, mordenite and the like or suitable base exchange modifications of these zeolites. Synthetic crystalline zeolite having pore sizes in the range of 3 to 15 Angstrom units, sold under the trade name Linde Type zeolites, are especially suitable for treatment by the method of the invention. A particularly preferred zeolite is a calcium sodium aluminosilicate known as a Linde Type 5 A. selective adsorbent.

The alkali metal salt used in the first treating step is a water soluble salt of sodium such as for example sodium chloride, sulfate, borate, carbonate, bicarbonate, aluminate, silicate, peroxide, phosphate or mixtures thereof. In the second treating step there is preferably used an aqueous solution of sodium hydroxide although other water soluble sodium salts such as those used in the first treating solution can also be employed in addition to or as a substitute for sodium hydroxide.

The third treating solution employs a water soluble salt having the cation to replace the exchanged sodium portion of the zeolite.

The concentration of the treating solution may vary from 2 to about 40% by weight with a preferred concentration between about 5 and 20% by weight for easy base exchange. Most satisfactory results are obtained when the treating solution is at an elevated temperature, i.e. in the range of from about 90 to about 212° F. and generally between about 150 and 210° F. at atmospheric pressure, and up to about 600° F. when pressure vessels are used, in recrystallizations for example the analcime and mordenite species of zeolites and similar zeolites.

It may be necessary to treat the spent selective adsorbent several times in each step with the aqueous solutions to effect complete conversion of the exchangeable cation content. In general two to four treatments in each step of from about 15 minutes to 150 minutes have been found satisfactory. More than about five treatments are unnecessary and less than two treatments result in incomplete exchange of the exchangeable cation portion of the molecular sieve. Optionally, a water wash step can be interposed between each treatment.

Optionally, one may wash the treated molecular sieve after each treatment, if necessary, with mildly acidified wash water to remove any traces of the treating solution, especially the sodium hydroxide solution in the second step.

In the final treating step wherein the exchanged cation is reintroduced into the 4 A. molecular sieve to produce a 5 A. sieve, one uses an aqueous solution of a salt having the necessary cation to replace the sodium cation of the zeolite with the cation of said salt. For example, if one was reintroducing calcium ion into a 4 A. molecular sieve which had been formed from a deactivated 5 A. sieve by base exchange with a sodium salt to form the sodium zeolite, followed by treatment with a caustic solution to effect crystallization of any non-zeolitic phase(s) back to the 4 A. zeolite structure, one would then employ a calcium salt such as calcium chloride, calcium nitrate, calcium formate, calcium acetate and the like. If other metal ions were to be reintroduced into the molecular sieve, such as zinc, magnesium, cadmium, strontium, manganese, etc., the aqueous treating solution would contain a water soluble salt of the appropriate metal ion such as zinc chloride, magnesium chloride, cadmium chloride etc.

Repetitive treatments may be necessary to attain the desired degree of reinstatement of the metal ion in the molecular sieve. In general, two or more treatments are desirable. A final water wash is desirable to remove any occluded residual exchange solution. Thereafter the reconverted molecular sieve is dried and activated in a conventional manner by heating in air to remove occluded water. Treatment of the molecular sieves by the method of this invention can be carried out in batch operations or if the sieves are in vessels, treatment can be in situ.

Following is a description by way of example of a method of carrying out the present invention.

A freshly regenerated dehydrated calcium zeolite A of Type 5 A. structure in the form of 1/16 inch extrudates which had been used in the separation of straight chain hydrocarbons from mixtures thereof with non-straight chain hydrocarbons and periodically regenerated (9 times) by controlled combustion with an oxygen containing gas was evaluated to determine its sorptive capacity for n-dodecane. The results are shown in the table below. For comparison, the capacity of the fresh (unused) dehydrated calcium zeolite Type 5 A. was also determined.

TABLE A.—DEHYDRATED SIEVE CAPACITY FOR n-DODECANE

| | Weight percent n-$C_{12}H_{26}$ Adsorbed | | |
|---|---|---|---|
| | Used | Unused | Used percent of unused capacity |
| Sorption Pressure, cm. Hg: | | | |
| 25 | 5.83 | 7.32 | 79.6 |
| 50 | 6.07 | 7.68 | 79.0 |
| 76 | 6.28 | 8.06 | 77.9 |

Example I

The used sieve was treated as follows:

Four 10 gram samples thereof are treated with aqueous sodium chloride solution to form the sodium zeolite then treated with aqueous caustic solutions of varying strengths and for different time periods to effect recrystallization of non-zeolitic phases formed during these regenerations. The concentrations, treating temperatures, times and number of repeat treatments are shown in Table B. The treatment effected recrystallization of non-zeolitic phases formed during the regeneration back into the Type A zeolites.

TABLE B

| | Sample | | | |
|---|---|---|---|---|
| | 1 | 2 | 3 | 4 |
| Grams NaOH | 2.9 | 2.9 | 5.8 | 5.8 |
| Grams $H_2O$ | 40 | 40 | 40 | 40 |
| Temperature, °F | 203 | 203 | 203 | 203 |
| Time, minutes | 30 | 120 | 30 | 120 |
| Number of treatments | 1 | 1 | 1 | 1 |

The four samples were washed five times with water to remove any remaining aqueous caustic from the zeolite. Each of the samples was then treated with an aqueous calcium chloride solution to replace the sodium ion in the zeolite with the calcium ion. A suitable treatment consisted of immersing the 10 gram sample of the now sodium zeolite in aqueous 19.5% by weight calcium chloride (7.8 grams in 40 ml. water). The solution was heated to about 200° F. and maintained thereat for 3 hours, while replenishing any water lost by evaporation. The zeolite samples were then water washed and retreated in the same manner for four additional calcium chloride treatments. A water wash was used after each treatment.

The four samples were allowed to dry at room temperature then placed in a vertical tube furnace and heated to 932° F. for 8 hours while passing dry air over the samples. The sorptive capacities of the treated zeolites were again determined for n-dodecane. The Table C below shows the results.

TABLE C.—PERCENT OF SORPTIVE CAPACITY FOR n-$C_{12}H_{26}$ BASED ON UNUSED 5 A. ZEOLITE

| | Before Treatment | Sample | | | |
|---|---|---|---|---|---|
| | | 1 | 2 | 3 | 4 |
| Sorption Pressure, cm. Hg: | | | | | |
| 25 | 79.6 | 82.1 | 82.9 | 91.9 | 94.8 |
| 50 | 79.0 | 82.0 | 82.3 | 90.9 | 95.1 |
| 76 | 77.9 | 80.8 | 82.3 | 90.1 | 94.7 |

Inspection of the results in the above table show that the method of the present invention was effective in improving or restoring the capacity of the molecular sieve. In particular the degree of improvement for samples 3 and 4 was greater than that of samples 1 and 2 and the latter samples showed some improvement in capacity by the treating method.

Example II

A commercial calcium sodium zeolite of Type 5 A. structure (1/16 inch extrudates) which have been used in commercial hydrocarbon separation process for some time and intermittently regenerated was evaluated to determine its adsorptive capacity for n-butane at 77° F. and 76 cm. of mercury pressure. The weight percent n-butane adsorbed amounted to 9.7%, basis dehydrated zeolite. (An unused calcium-sodium type 5 A. zeolite adsorbed 10.8% of n-butane, basis dehydrated zeolite, under these same conditions.)

A sample of spent calcium-sodium zeolite after regeneration (126.3 grams) was reduced to a powder (60 mesh and finer) and was converted to the sodium form by 5 repetitive treatments of 10.6% by weight aqueous sodium chloride.

Each treatment took about one hour and the solution temperature was about 212° F., with continuous mechanical stirring. The sample was water washed twice between each treatment. The resulting sodium exchanged zeolite was thereafter treated with 11.3% by weight aqueous sodium hydroxide for three hours, at 200° F. After several water washes, the sodium zeolite was reconverted to the calcium form of zeolite by treatment with a 15% by weight aqueous calcium chloride solution at 200° F. for three hours. In all five such calcium salt treatments were carried out with mechanical stirring during each treatment. The resulting calcium zeolite then was washed and subsequently dehydrated to remove zeolitic water.

The sorptive capacity of the restored, dehydrated zeolite for n-butane at 77° F. and 76 cm. mercury was found to be 10.2 weight percent, a gain of 5.1% in capacity from its spent capacity.

In general, the method of the present invention is applicable to a Type 5 A. zeolite in the form of extrudates, beads, granules, pellets or other grossly particulate form without impairment of the form or strength of the particles. Alternatively the material can be reduced to finely granular or powdered form, treated by the method of the invention, then reformed into larger aggregates, e.g. extruded granules and the like by appropriate methods. In instances where the material is treated in situ the granular zeolite is permitted to soak in any of the various treating solutions which are changed or replenished to maintain the strength of the salt or sodium hydroxide therein to effect the desired base exchange. Alternatively, one may pass the treating solution through the vessel containing the zeolite undergoing treatment until the exchange has been completed.

The method of the present invention is also applicable to other zeolites, especially zeolites employed as catalysts and/or catalyst supports, such as the Type X and Y molecular sieves, where maintenance of the zeolite structure is essential. The zeolite catalyst or catalyst support when the cation is other than sodium, requires treatment with an aqueous sodium metal salt solution to form the corresponding sodium zeolite, followed by treatment with aqueous sodium hydroxide, and the final treatment to effect exchange of the sodium in the zeolite for the replaced cation.

In the second treating step with such zeolites one will use treating temperatures of 150–250° F. for the Type X and Y sieves and 500–580° F. for the mordenite species, under autogenous pressure.

Obviously, many modifications and variations of the invention as hereinbefore set forth may be made without departing from the spirit and scope thereof, and therefore, only such limitations should be imposed as are indicated in the appended claims.

I claim:
1. A method of treating a molecular sieve selective adsorbent which has been periodically regenerated which comprises in a first step treating said regenerated selective adsorbent with an aqueous solution of a water soluble alkali metal salt to convert the exchangeable cation content of said zeolite to said alkali metal, in a second step treating said converted zeolite with an aqueous solution of sodium hydroxide to convert non-zeolitic to zeolitic phases, then contacting said alkali metal zeolite with an aqueous solution of a water soluble salt having the same cation that had been removed from said selective adsorbent by said alkali metal salt solution to exchange said cation with said alkali metal portion of said zeolite.

2. Method as claimed in claim 1 wherein said selective adsorbent is a calcium substituted sodium aluminosilicate of Type 5 A. structure, said alkali metal salt is sodium chloride and said water soluble salt is calcium chloride.

3. Method as claimed in claim 1 wherein at least about 40% of the the exchangeable cation content of the selective adsorbent is calcium.

4. Method as claimed in claim 1 wherein said treating steps are carried out for at least two times each and less than six times each.

5. A method of restoring the adsorptive capacity of a regenerated synthetic molecular sieve selective adsorbent which comprises treating the adsorbent with a solution of a water soluble alkali metal salt to effect at least partial replacement of the exchangeable cation content of said adsorbent with at least part of the cation content of said salt, then contacting said treated adsorbent with an aqueous solution of sodium hydroxide to convert non-zeolitic phases to alkali metal zeolite, then treating said adsorbent with an aqueous solution of a salt to replace the exchanged cation of said adsorbent with the cation of said salt, drying and dehydrating the resulting zeolite.

References Cited

UNITED STATES PATENTS

| 2,480,627 | 8/1949 | Bodkin et al. | 252—412 |
| 3,301,792 | 1/1967 | Lewallen et al. | 252—455 X |
| 3,375,204 | 3/1968 | Hoke | 252—455 X |

DANIEL E. WYMAN, Primary Examiner

C. F. DEES, Assistant Examiner

U.S. Cl. X.R.

23—112; 55—75